Nov. 16, 1948. V. SAGER 2,454,213
APPARATUS FOR FORMING FILTER ELEMENTS AND THE LIKE
Filed May 15, 1944 4 Sheets-Sheet 1
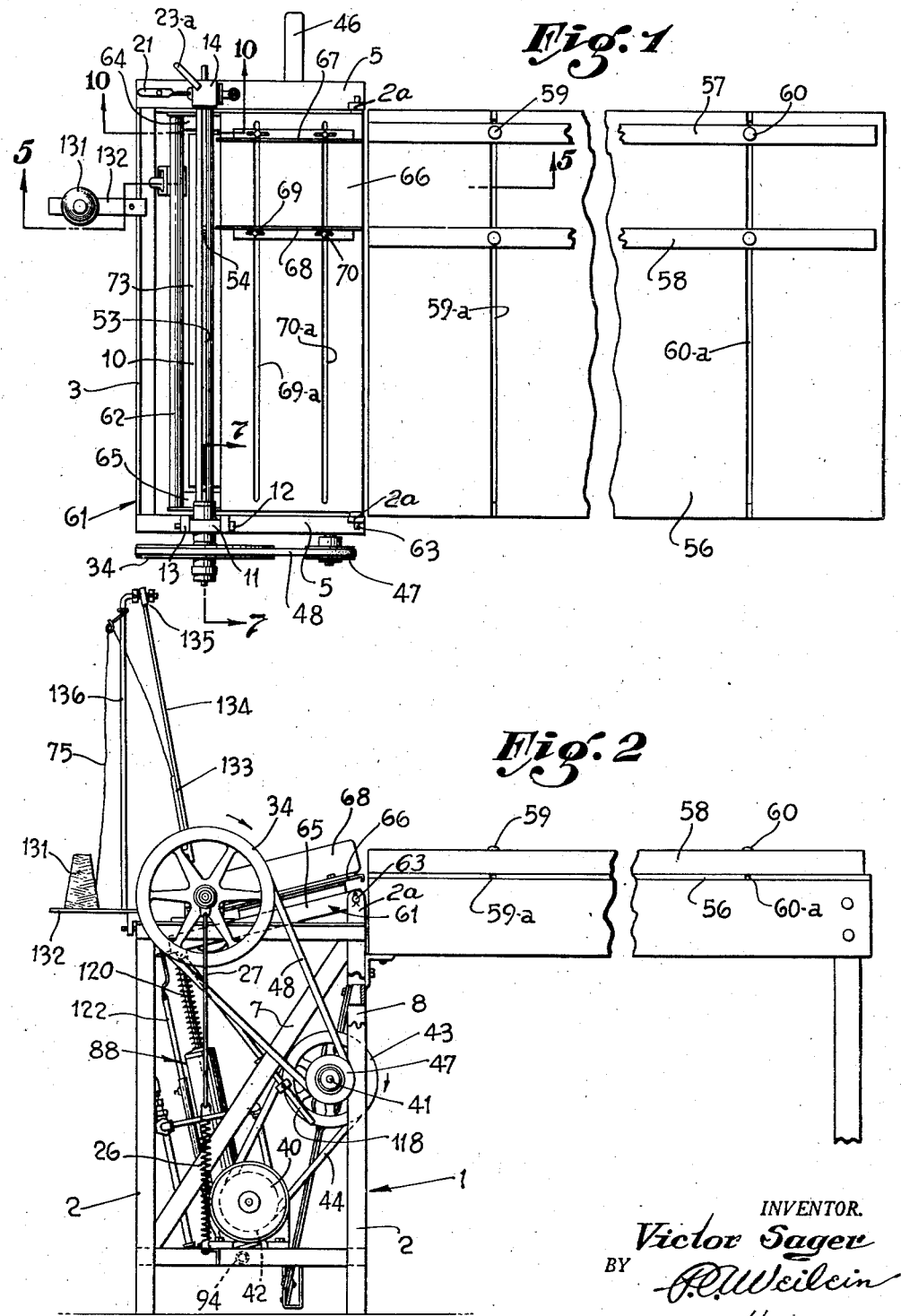
INVENTOR.
Victor Sager
BY
Attorney Nov. 16, 1948. V. SAGER 2,454,213
APPARATUS FOR FORMING FILTER ELEMENTS AND THE LIKE
Filed May 15, 1944 4 Sheets-Sheet 2
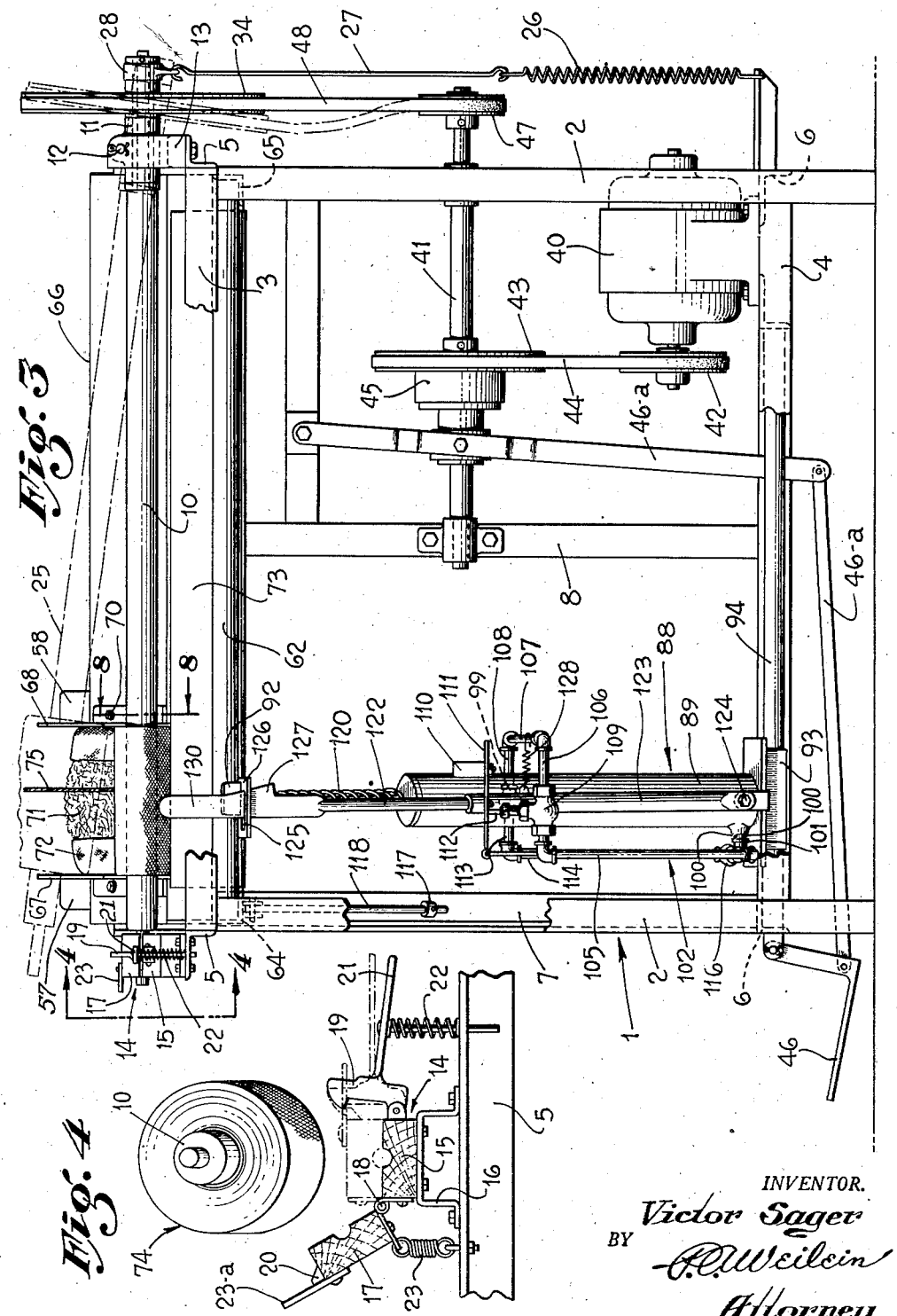
INVENTOR.
Victor Sager
BY
Attorney

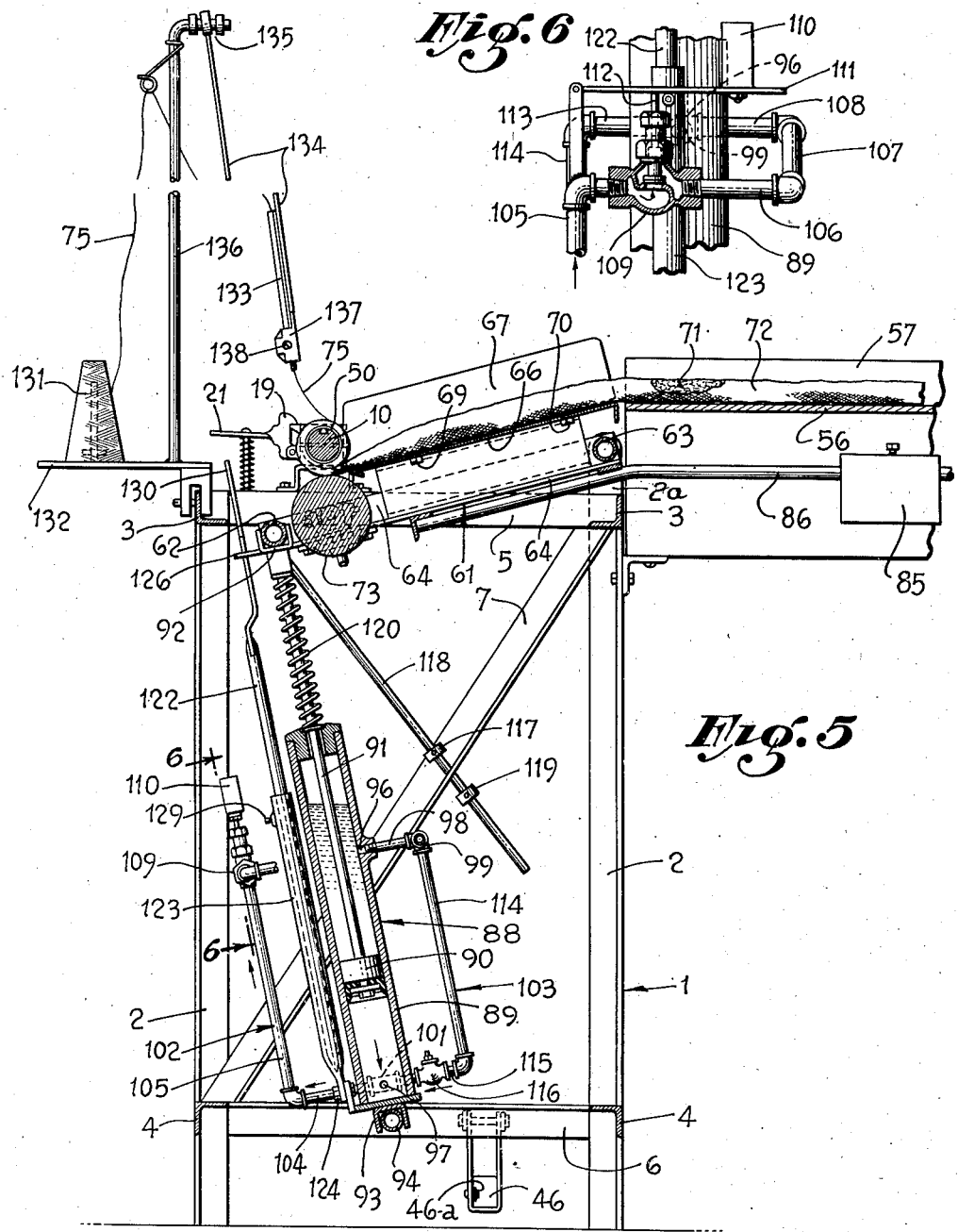

Nov. 16, 1948.  V. SAGER  2,454,213
APPARATUS FOR FORMING FILTER ELEMENTS AND THE LIKE
Filed May 15, 1944  4 Sheets-Sheet 4
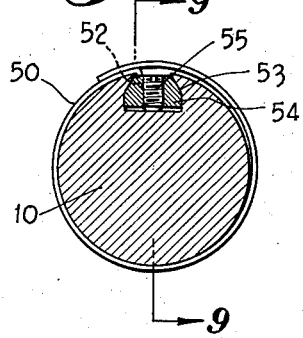
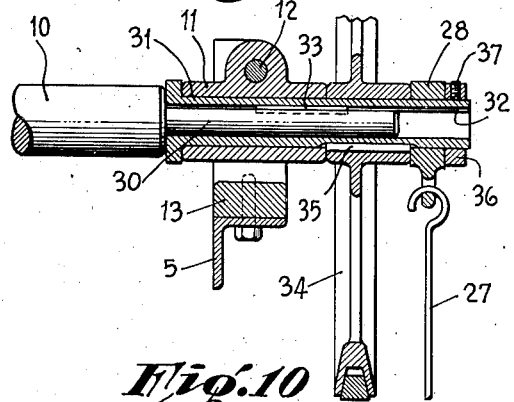
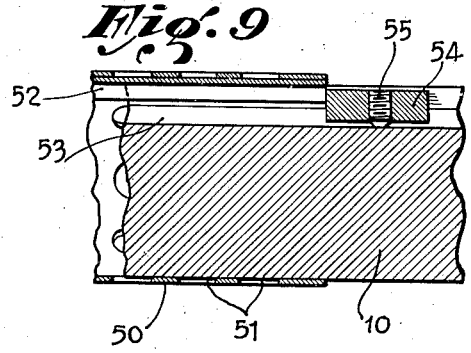
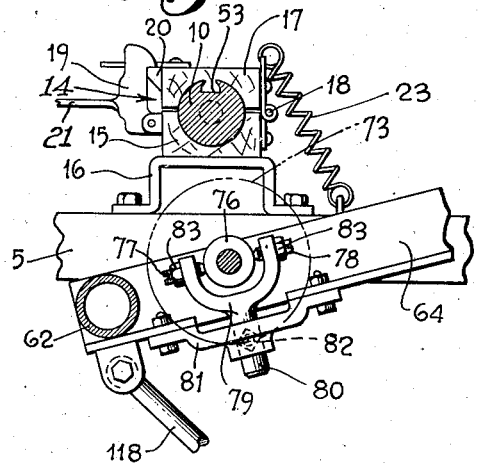
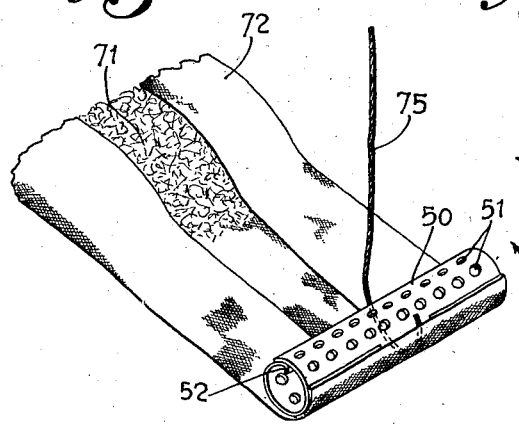
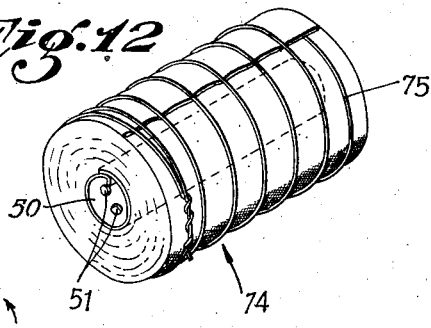
INVENTOR.
Victor Sager
BY
Attorney Patented Nov. 16, 1948

2,454,213

UNITED STATES PATENT OFFICE 2,454,213

APPARATUS FOR FORMING FILTER ELEMENTS AND THE LIKE

Victor Sager, Arcadia, Calif., assignor to Diesel Filter Co., El Monte, Calif., a limited partnership Application May 15, 1944, Serial No. 535,590

21 Claims. (Cl. 242—1)

1

This invention relates generally to winding apparatus, and is directed particularly to improvements in apparatus for producing spool-type filter elements such as are commonly employed in filter devices used in lubricating systems, diesel fuel systems and the like.

Filter elements of the type in question usually comprise a central perforated core of metal or other rigid material, on which are wound several layers of filter material. The filter material preferably consists of a sheet of fibrous material, such as a mixture of shredded fibres of cotton, wool, and sisal, the loosely agglomerated fibrous material being enclosed within a wrapping of muslin or other textile material.

It is highly desirable that the filter material be compacted to a uniform density as it is wound on the core, in order to assure uniform flow of the liquid being filtered throughout the entire mass. Variations in the density of the filter pack are conducive to the formation of channels of flow through the less tightly compacted portions, thus reducing the effective volume of filter material interposed in the path of the liquid. Inasmuch as the density of the filter pack is determined, to a major extent, by the pressure exerted against the successive layers of filter material as they are wound on the core, it is an important object of this invention to provide winding apparatus incorporating means for maintaining a uniform pressure against the material throughout the winding operation.

Different types of liquids require filter elements of varying density in order to obtain the maximum filtering effect. For this reason, it is very desirable that the winding apparatus be capable of exerting any desired pressure on the filter pack. Furthermore, different batches of filter material may vary in texture and in the proportions of the various ingredients, which factors affect the compressibility of the mixture. It is, therefore, a further object of the invention to provide means whereby the pressure exerted against the pack may be varied as desired, and may be closely controlled within predetermined limits.

Filter elements vary considerably both in length and in diameter, depending on the type of equipment with which they are to be associated. A further object is to provide apparatus which is readily adaptable to the production of filter elements of widely varying lengths and diameters. A still further object is to provide apparatus of the foregoing type embodying means for maintaining the outside diameter of the filter element within closely defined, predetermined limits.

2

In addition to the foregoing objects, it is a general object of this invention to provide apparatus which is readily adaptable to a wide range of operating conditions, and which facilitates the economic production of filter elements conforming to rigid specifications as to size, shape and quality.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 1 is a top plan view of a winding machine embodying the features of the invention;

Figure 2 is a view in side elevation of the apparatus shown in Figure 1;

Figure 3 is an end elevation, as viewed from the left of Figures 1 and 2;

Figure 4 is an enlarged fragmentary view taken on line 4—4 of Figure 3;

Figure 5 is a longitudinal sectional view taken on line 5—5 of Figure 1; and depicting a partially wound filter pack;

Figure 6 is a fragmentary view taken on line 6—6 of Figure 5;

Figure 7 is a sectional view taken on line 7—7 of Figure 1;

Figure 8 is a sectional view taken on line 8—8 of Figure 3;

Figure 9 is a sectional view taken on line 9—9 of Figure 8;

Figure 10 is a sectional view taken on line 10—10 of Figure 1;

Figure 11 is a perspective view illustrating the initial stage of winding the sheet of filter material about the core; and, Figure 12 is a perspective view of a completed filter element.

Referring particularly to Figures 1, 2, 3 and 5 of the drawings, it will be observed that the apparatus constitutes a unitary device mounted on a rectangular framework generally designated 1, and comprising vertical legs 2, upper and lower horizontal side members 3 and 4, upper and lower end members 5 and 6, diagonal braces 7, and an intermediate upright member 8.

Extending transversely of the frame above the upper frame members 3 and 5 is a power-driven mandrel 10 on which the filter element is mounted during the winding operation. The manner in which the mandrel is mounted is of particular interest, and is shown most clearly in Figures 3, 4 and 7. The right-hand end of the mandrel, as viewed in Figure 3, is journaled in a bearing 11 which is pivotally connected, by a pivot pin 12, to a trunnion bracket 13 mounted on one of the end frame members 5. The opposite end of the mandrel is journaled in a horizontally split bearing 14 of the pillow block type, the lower section 15 of which is rigidly secured to a bracket 16 mounted on the other end frame member 5. The upper section 17 of the bearing is pivotally connected at 18 to the lower section 15 at one side thereof, and, as is shown most clearly in Figure 4, the upper section 17 is releasably retained in its operative position by a latch 19 pivotally mounted on the lower bearing section and engageable with a lug 20 on the upper bearing section. An operating lever 21 extends outwardly from the latch in a position wherein it may be depressed by the operator to release the latch. The latch is normally urged into latching engagement with the lug 20 by a compression spring 22 interposed between the lever 21 and the frame member 5. A tension spring 23 serves to urge the bearing section 17 into open position upon release of the latch 19, and a handle 23a is preferably provided on the bearing section 17 to facilitate manual manipulation thereof to closed position.

By reason of the foregoing construction, the mandrel 10 is mounted for limited tilting movement in a substantially vertical plane about the axis of the pivot pin 12, from its operative position to an upwardly inclined position indicated by broken lines at 25 in Figure 3. The purpose of this adjustment is to free one end of the mandrel in order to enable the operator to apply a filter core thereto by slipping it axially over the free end thereof, and to remove the filter element in the same manner after completion of the winding operation. By depressing the lever 21 the latch 19 is released, whereupon the upper bearing section 17 is swung to the open position shown in Figure 4, thus permitting the contiguous end of the mandrel to be raised. A tension spring 26 is connected, by a rod 27, to a collar 28 journaled on the opposite end of the mandrel, and urges the mandrel into its raised position when the bearing section 17 is swung clear of the mandrel.

In order to facilitate the interchangeable use of mandrels of varying diameters to fit various sizes of filter cores, the end of the mandrel adjacent the pivoted bearing 11 is provided with a reduced extension 30 which is adapted to be inserted in the bore of a drive sleeve 31. The sleeve bore is splined at 32 for driving engagement with a key 33 on the mandrel extension 30. A driving sheave 34 is keyed at 35 to the overhanging portion of the sleeve 31. The collar 28 to which the spring 26 is connected is journaled on the sleeve 31 on the outboard side of the sheave 34, and is retained by a ring 36 secured to the sleeve by suitable means such as a set screw 37. By providing different sized mandrels with identical extensions 30, it is obvious that the mandrels may be readily interchanged without disturbing the bearing 11, the sheave 34 or the collar 28. The time and effort required to adapt the machine to the production of different sized filter elements is thus greatly reduced.

During the winding operation, the mandrel is rotated by the sheave 34, which is driven by any suitable power source. In the present instance, an electric motor 40 is mounted in the lower portion of the frame 1, and is connected in driving relation with a countershaft 41 by sheaves 42 and 43 and belt 44. The countershaft is journaled in bearings mounted on the upright 8, and an adjacent leg 2 of the frame, and is releasably coupled to the sheave 43 by a clutch 45. A foot pedal 46 is mounted adjacent the operator's station and is operatively connected to the clutch by suitable linkage 46a. A sheave 47 is mounted on the overhanging end of the countershaft 41 and is connected in driving relation with the sheave 34 by a belt 48. By virtue of its inherent flexibility and resiliency, the belt 48 does not interfere with the aforementioned angular displacement of the mandrel 10 about the axis of the pivot pin 12.

The metallic core of the filter element is preferably constructed as shown in Figures 8, 9 and 11. In its preferred embodiment, it comprises a hollow cylinder 50, open at both ends and having relatively large perforations 51 to permit the lubricant to flow freely through the wall thereof. The core is preferably formed from sheet metal by bending around a suitable mandrel and securing the longitudinal edges in overlapping relation by spot welding or other suitable means. It will be observed that the inner edge is bent sharply inwardly to form a rib or flange 52, which is adapted to engage an axially extending slot 53 in the periphery of the mandrel 10, to effect driving engagement between the mandrel and the core.

As previously mentioned, the apparatus is adaptable to the production of filter elements of varying lengths. In order to facilitate the positioning of cores of varying lengths on the mandrel, an adjustable stop is provided. As shown most clearly in Figure 8, the slot 53 in the mandrel is undercut or dovetailed in cross-section, and is adapted to slideably retain a similarly shaped abutment member 54. The latter may be secured in any desired position along the axis of the mandrel by a set screw 55, and, as shown in Figure 9, when secured in place it forms an abutment engageable by the adjacent end of the flange 52 on the core, thus positioning the core on the mandrel in proper relation to the sheet of filter material to be wound thereon.

The preparation of the sheet of filter material is performed on a platform 56 secured to the upper portion of the frame 1 and extending laterally of the frame a distance sufficient to accommodate a sheet of filter material of maximum length. A pair of upstanding guide members or plates 57 and 58 are adjustably mounted on the platform by releasable clamping bolts 59 and 60 secured to said members and slidability engaging respectively, transversely extending slots 59–a and 60–a in the platform 56. Thus, by adjusting the positions of the clamping bolts along the slots, the guide members may be suitably spaced apart to accommodate filter packs of varying widths.

A tilting frame, generally designated 61, is pivotally mounted on the upper portion of the main frame 1 in a manner to permit limited oscillation thereof about a horizontal axis parallel to the axis of the mandrel 10. The frame 61 comprises a pair of spaced, parallel supports 62 and 63, herein shown as tubular members, connected together at their opposite ends by the frame members 64 and 65. The tubular member 63 is preferably journaled at its opposite ends in brackets 2a mounted on the main frame, thus affording a pivotal mounting for the frame 61.

A feed apron 66 is attached to the frame 61 and spans the gap between the platform 56 and the mandrel 10. The apron is provided with a pair of adjustable guide plates 67 and 68, generally similar to the guide members 57 and 58 on the platform 56. The guide plates 67 and 68 are adjustably mounted on the apron 66 by clamping bolts 69 and 70 slideably engaging respectively transverse slots 69-a and 70-a in the apron. In this manner, the guide plates can be adjusted and secured in alignment with the guide members 57 and 58.

As previously stated, the filter pack preferably comprises a continuous layer of fibrous material 71 confined within a wrapping of muslin or other suitable textile material 72. It has been found that a mixture of shredded fibres of cotton, wool and sisal constitutes a highly satisfactory filter material, although it will be understood that other materials may be employed if desired. To prepare a filter pack for wrapping on a core, the guide members 57, 58, 67 and 68 are first adjusted to the proper spacing to accommodate a filter pack of the desired width. A sheet of muslin is then spread on the platform 56 between the guide members 57 and 58, with the lateral edges of the cloth overlying the guide members. A suitable quantity of filter material is then placed on the muslin and evenly distributed in a thin layer, care being taken to assure that the layer completely fills the space between the guide members and is of substantially uniform thickness except at the ends, where it is preferably tapered off gradually. At each end of the pack, the muslin preferably extends a short distance beyond the layer of filter material, in order to provide several wraps of muslin preceding and following the filter material. After the layer of filter material is prepared, the lateral edges of the muslin are folded inwardly over the filter material, in a manner shown most clearly in Figure 11. The inturned edges may overlap to completely enclose the filter material, or, as shown in Figure 11, they may only partially cover the upper surface of it.

When the filter pack is thus prepared, it is slid forwardly over the surface of the platform and the feed apron 66, and the leading edge of the muslin is inserted between the core 50 mounted on the mandrel 10 and a pressure roll 73, the function of which is hereinafter set forth. The motor 40 is then started, causing the mandrel to rotate and wind the pack onto the core, to produce a filter element 74 such as is shown in Figure 12.

It will be observed, with reference to Figure 5, that the feed apron 66 slopes downwardly from the platform 56 to the lower side of the mandrel. This downward inclination of the apron serves a very useful purpose during the winding operation, by introducing a bend in the path of travel of the filter pack as it is fed to the mandrel. Because of the substantial thickness of the uncompressed layer of filter material, the downward bending subjects the upper folds of muslin to greater tension than that imposed on the lower layer, thus drawing the upper folds down tightly against the layer of filter material and preventing bulging of the edges. Consequently the folds are wound smoothly on the core.

After the filter pack is wound on the core, it is secured in place by a wrapping of twine or other binding material 75. As shown in Figure 11, one end of the twine is anchored between the core and the innermost layer of muslin at the outset of the winding operation, and as the winding proceeds the twine is wound simultaneously with the filter material. Several wraps of twine are applied to the outer periphery of the filter element, being distributed more or less uniformly over the entire length thereof, to secure the final wraps of muslin firmly in place.

A difficulty which is frequently encountered during the winding operation is the tendency of the sheet of filter material to creep toward one end or the other of the core. This may be caused by failure of the operator to insert the leading edge of the fabric squarely between the core and the pressure roll, or it may be due to a slight bias in the weave of the fabric. Whatever the cause of this creeping tendency, it may be counteracted by suitable angular adjustment of the axis of the pressure roll 73 out of parallelism with the axis of the mandrel 10. The maximum compensating effect is obtainable by adjusting the axis of the pressure roll in a plane parallel to the surface of the feed apron 66, or, in other words, by disposing the axis of the pressure roll at an oblique angle to the direction of feeding movement of the filter material. In this manner, a "steering" effect is produced which tends to veer the fabric in a direction counter to that of the creeping effect.

In addition to the aforementioned adjustment, it is also desirable that the pressure roll 73 be capable of angular adjustment toward the mandrel 10, to cause the pressure roll to exert greater pressure on one end of the filter pack than on the other end. The filter material is thus compressed to a greater extent at the end subjected to higher pressure, resulting in the production of a tapered filter element, such as is required for certain types of filter cases.

In order to permit adjustment of the axis of the pressure roll both in the plane of the feed apron 66 and transversely thereto, the pressure roll is preferably journaled in bearings which are adjustably mounted on the tilting frame 61. Referring to Figure 10, which depicts one of two identical bearing mountings, it will be observed that the pressure roll 73 is journaled in a bearing 76 supported by a pair of aligned trunnion pins 77 and 78, which are axially adjustable in the ends of a forked bracket 79. By adjusting the pins simultaneously in the same direction, the bearing may be adjusted laterally in a direction parallel to the surface of the feed apron 66. The pins 77 and 78 also serve as trunnions or pivots to permit tilting of the axis of the pressure roll toward the mandrel 10. The shank portion 80 of the bracket 79 is slidably and rotatably mounted in a bore formed in a bracket 81 secured to an end frame member such as 64 of the tilting frame 61, thus permitting both vertical and angular adjustment of the forked bracket 79 relative to the frame. The bracket 79 is secured in adjusted position by a set screw 82, and the trunnion pins 77 and 78 are provided with lock nuts 83 to secure them in adjusted position.

From the description thus far, it will be apparent that the pressure roll 73 is universally adjustable relative to the tilting frame 61, and that the latter is pivotally mounted on the main frame 1 to permit movement of the pressure roll bodily toward or away from the mandrel 10.

Means is provided for applying an upward force to the tilting frame of sufficient magnitude to offset the weight of the frame and pressure roll, and to cause the pressure roll to exert an initial pressure of predetermined magnitude on the filter pack. As shown herein, a counterweight 85 (Figure 5) is mounted for adjustment along an arm 86 rigidly attached to the frame 61. Under static conditions, a counterweight satisfactorily fulfills the requirement of an adjustable pressure-applying means, and is preferable to a spring inasmuch as the force exerted by a spring varies as it is compressed or extended. However, a counterweight is dynamically unstable because of the inertia of its mass. In other words, any accelerated motion of the counterweight develops a supplemental force acting on the moving mass, thus momentarily augmenting or decreasing the pressure exerted by the pressure roll against the filter pack.

The manner in which the above mentioned condition of dynamic instability may develop during the winding operation, and its effect on the filter pack, will be apparent from the following analysis: at the outset of the winding operation, the increase in diameter of the pack is very slight, due to the negligible thickness of the fabric, and hence the downward movement of the frame 61 and the pressure roll 73 is very gradual. However, when the tapered leading edge of the pad of filter material reaches the mandrel, the pack rapidly increases in diameter, accelerating the downward movement of the frame. This acceleration is only momentary, ceasing when the unformly thick portion of the pad reaches the mandrel, and thereafter the rate of descent of the frame and pressure roll would be constant under dynamically stable conditions. However, the momentary upward acceleration of the counterweight, caused by the downward acceleration of the frame, has developed an upwardly directed force acting on the counterweight, causing a momentary decrease in pressure on the filter pack. This, in turn, is followed by a momentary increase in pressure as the counterweight tends to establish a condition of equilibrium. It is obvious that during the momentary decrease in pressure, the filter material passing between the mandrel and the pressure roll is less tightly compacted, and during the subsequent momentary increase in pressure the filter material is abnormally compacted. It frequently happens that the time interval of this initial cycle of "hunting" action coincides with the rotative speed of the mandrel, so that the zones of loosely and tightly compacted material are formed on diametrically opposite sides of the filter pack. In that case, the surface of the pack becomes eccentric to the axis of the mandrel, and, as the winding proceeds, the "hunting" action is increased in magnitude and develops into a pronounced bouncing action of the pressure roll against the filter pack. As a result, the shape of the completed filter element is badly distorted, and the density of the filter material is far from uniform.

The manner in which the foregoing difficulty has been overcome constitutes an important feature of the invention. As shown most clearly in Figures 3, 5 and 6, a hydraulic braking or pressure control device, generally designated 88, is interposed between the tilting frame 61 and the main frame 1 in a manner to control the downward movement of the tilting frame. The braking device comprises a cylinder 89 connected to the main frame, a piston rod 91 connected to the tilting frame, and a piston 90 on the lower extremity of the piston rod and slideable in the cylinder. Preferably, the braking device is mounted for adjustment in a direction parallel to the axis of the pressure roll, so that it may be adjusted to a position midway between the ends of the filter element on the mandrel 10. Uniform distribution of the pressure on the filter element is thus assured. Adjustment of the braking device in the above manner is made possible by the provision of a forked bracket 92 attached to the upper extremity of the piston rod 91 and slideably embracing the tubular frame member 62, and by slideably connecting the lower extremity of the cylinder 89, by means of a forked bracket 93, to a tubular frame member 94 on the main frame.

The cylinder 89 is adapted to be partially filled with a suitable liquid, such as a light gravity oil, and is provided with ports 96 and 97 located adjacent opposite ends thereof. The port 96 is connected by a conduit 98 to a T-fitting 99, and the port 97 is similarly connected by a conduit 100 to a T-fitting 101. Extending between the two T-fittings are two separate circuits, generally designated 102 and 103. The function of the circuit 102, comprising conduits 104, 105, 106, 107 and 108, is to permit the controlled escape of fluid from the cylinder space below the piston to the space above the piston, and thus allow the piston to descend, when the fluid pressure below the piston reaches a predetermined magnitude. To this end, a pressure regulating valve 109 is interposed in the circuit, preferably in the conduit 106 as shown in Figure 6. The opening movement of the valve is opposed by a weight 110 adjustably mounted on a lever 111 engaging the upper extremity of the valve stem 112. In this manner, the piston is restrained from downward movement until the pressure of the fluid below the piston and in the circuit 102 is sufficient to overcome the downward force exerted by the weight 110 and open the valve.

It will be understood that during the winding operation the increase in diameter of the filter pack forces the pressure roll 73 and its supporting frame 61 downwardly, thus causing the piston 90 to develop pressure in the fluid below the piston and in the circuit 102. Fluid cannot escape from the cylinder, however, until the pressure attains a predetermined magnitude, depending on the adjustment of the regulating weight 110. When this presure is reached, the valve is opened, the extent of opening movement being dependent on the rate of descent of the piston. In other words, the valve opens only an amount sufficient to permit fluid to pass therethrough while maintaining the predetermined fluid pressure. In the event the pressure should tend to decrease momentarily, due to the above mentioned "hunting" action of the counterweight 85, the valve immediately moves toward closed position, thereby retarding the flow of fluid and everting a braking action on the frame 61 and pressure roll 73. The "hunting" action is thus effectively counteracted at its inception, and the pressure exerted by the pressure roll against the filter pack is maintained constant throughout the winding operation, irrespective of the rate of increase in the diameter of the filter pack.

The fluid circuit 103, comprising conduits 113, 114 and 115, serves solely as a return conduit to permit return of fluid to the cylinder space below the piston when the latter is retracted upwardly after completion of the winding operation. In order to prevent reverse flow in the circuit 103, a check valve 116, opening toward the lower cylinder port 91, is interposed in the circuit.

Inasmuch as the filter elements under consideration are of the replaceable type, it is important that they conform in outside diameter to fairly rigid specifications. In the present instance, the extent of downward movement of the tilting frame, and hence the diameter of the finished product, is predetermined by the adjustment of an abutment collar 117 adjustably mounted on a rod 118. As shown in Figures 3 and 5, the rod is pivotally connected at its upper end to the frame 1 at the side thereof adjacent the operator's position, the lower end of the rod extending through an aperture in the diagonal brace 7. The abutment collar 117 is mounted on the rod on the upper side of the brace, and is adapted to be secured in a predetermined position wherein it engages the brace and prevents further descent of the frame 61 and the pressure roll 73 when the filter element has attained a predetermined diameter. A second abutment collar 119 is also adjustably mounted on the rod 118 below the brace 7, and serves to limit the upward movement of the frame 61. By suitable adjustment of the collar 119 along the rod 118, the uppermost position of the pressure roll may be varied in accordance with the particular size of mandrel being used.

To assist in returning the frame 61 to its initial position after the completed filter element has been removed from the mandrel and the mandrel returned to its operative latched position, a compression spring 120 is interposed between the upper end of the cylinder 89 and the forked bracket 92 on the upper end of the piston rod. It is not contemplated that this spring be of sufficient strength to have any substantial effect on the pressure exerted by the pressure roll against the filter pack, as in that case the pressure on the filter pack would progressively increase during the winding operation. On the contrary, the spring is preferably of only sufficient strength, when compressed, to overcome fluid friction in the return circuit 103 of the hydraulic braking device 88 and to raise the piston to its initial position.

In addition to restraining the tilting frame 61 against further descent when the filter pack has attained the required diameter, it is also desirable to temporarily restrain the frame against retractive upward movement until the mandrel ceases to rotate. If the frame and pressure roll were free to move upwardly and continue to exert pressure on the filter pack after completion of the winding operation, continued rotation of the mandrel would result in reduction of the diameter of the pack below that desired, due to further compression of the filter material. In that case, the diameter of the finished product would vary in accordance with the time interval between completion of the winding operation and manual release of the mandrel from the split bearing 14. However, by restraining the frame 61 against upward movement when the filter pack has attained the desired size, this size is maintained irrespective of the length of time the mandrel is allowed to rotate after the winding operation is completed. Furthermore, continued rotation of the mandrel is not only necessary in order to apply several wraps of binding twine 75 to the outside of the filter element, but it also serves another useful purpose, provided the pressure roll is restrained against upward movement. It enables the pressure roll to iron out any slight irregularities in the surface of the filter element, and produces a smooth cylindrical surface, thus contributing materially to the quality of the finished product.

A latch mechanism for temporarily latching the frame 61 and pressure roll 73 in their lower position is shown in Figures 3 and 5. It comprises a pair of telescopically arranged arms 122 and 123, the lower arm 123 being pivotally connected at 124 to the lower extremity of the cylinder 89, and the upper arm 122 extending through a slot 125 in a latch plate 126 mounted on the forked bracket 92. A latch lug or projection 127 is formed on the upper arm 122, providing a downwardly facing shoulder adapted to engage the upper surface of the latch plate 126 and thus restrain the frame 61 against upward movement. A spring 128 is connected to the lower latch arm 123 and yieldingly urges the latch toward its latching position.

The telescopic arrangement of the latch arms 122 and 123 permits vertical adjustment of the arm 122 into a position wherein the latch lug 127 engages the upper surface of the latch plate 126 at approximately the same time that the abutment 117 engages the diagonal brace 7. The arm 122 may be secured in adjusted position by any suitable means, such as a set screw 129. It is thus apparent that upon completion of a winding operation the frame 61 and pressure roll 73 are positively restrained by the abutment 117 against further downward movement, and are temporarily latched in their lower position by the latch mechanism just described. An operating handle 130 is provided on the upper latch arm 122 to facilitate manual release of the latch.

The binding twine 75 is fed to the filter element from a roll 131 mounted on a bracket 132 conveniently mounted on the frame 1. The twine is guided through a tube 133 attached to an arm 134 having its upper end universally pivotally connected at 135 to an upstanding support 136 mounted on the bracket 132. As the twine emerges from the lower end of the guide tube 133, it passes through a split friction clamp 137 attached to the arm 134. An adjusting screw 138 on the clamp enables the two halves thereof to be adjusted toward or away from each other to impose any desired frictional drag on the twine as it is drawn therethrough, thus controlling the tension in the twine. The guide tube 133 also serves as a convenient handle by which the operator may manipulate the arm 134 about its universal pivotal connection 135, to guide the twine during winding. The operator's hand is thus protected from cutting by the twine, and a predetermined, uniform tension is maintained on the twine.

From the foregoing detailed description of what is now considered a preferred embodiment of the invention, it will be apparent that the apparatus embodies features which greatly facilitate the production of filter elements of a wide variety of sizes and filter characteristics. The novel means described herein enable close control of operating conditions, particularly those which influence the quality of the finished product. It is thus possible to produce filter elements of uniform characteristics, conforming closely to predetermined specifications as to size, shape and porosity.

I claim:

1. Winding apparatus comprising a work-supporting member, a pressure member, means mounting one of said members for movement toward or away from the other member, and means operable upon movement of said movable member into predetermined spaced relation to the other member for restraining said member against movement in either direction.

2. Winding apparatus comprising a work-supporting member, a pressure member, means mounting one of said members for movement toward or away from the other member, abutment means for limiting movement of said movable member in one direction, and latch means for releasably restraining said movable member against movement in the opposite direction.

3. Winding apparatus comprising a work-supporting member, a pressure member, means mounting one of said members toward or away from the other member, abutment means limiting movement of said movable member away from the other member, and latch means operable upon movement of said movable member into predetermined spaced relation to the other member for releasably restraining said movable member against movement toward the other member.

4. Winding apparatus comprising a work-supporting member, a pressure member, means mounting one of said members for movement toward or away from the other member, and adjustable latch means comprising a slotted element and a toothed element, extending through the slot and movable therein, one of said elements being carried by said movable member, said elements cooperating to releasably secure said movable member in any one of a plurality of positions in different spaced relation to the other member.

5. Winding apparatus comprising a work-supporting member, a pressure member, means mounting one of said members for movement toward or away from the other member, and extensible latch means comprising a pair of telescopically arranged elements for releasably securing said movable member in any one of a plurality of positions in different spaced relation to the other member.

6. In a winding apparatus, a rotatable work-supporting member, a rotatable pressure member, means mounting one of said members for movement toward or away from the other member, brake means for controlling movement of said movable member, and means mounting said brake means for adjustment in a direction substantially parallel to the axis of said movable member.

7. In a winding apparatus, a rotatable work-supporting member, a rotatable pressure member, means mounting one of said members for movement toward or away from the other member, latch means for releasably retaining said movable member in predetermined spaced relation to the other member, and means mounting said latch means for adjustment in a direction substantially parallel to the axis of said movable member.

8. In a winding apparatus, a rotatable work-supporting member, a rotatable pressure member, means mounting one of said members for movement toward or away from the other member, brake means for controlling movement of said movable member, latch means for releasably retaining said movable member in predetermined spaced relation to the other member, and means mounting said brake means and said latch means for adjustment in a direction substantially parallel to the axis of said movable member.

9. Winding apparatus comprising a rotatable work-supporting member, a rotatable pressure member, means mounting said members for rotation about normally parallel axes, and means for adjusting one of said members to dispose the axis thereof in non-parallel relation to the axis of the other member.

10. Winding apparatus comprising a rotatable work-supporting member, a rotatable pressure member, means mounting said members for rotation about normally parallel axes, and means for adjusting one of said members in a direction parallel to a plane common to the axes of said members, to dispose the axes of said members in non-parallel but coplanar relation.

11. Winding apparatus comprising a rotatable work-supporting member, a rotatable pressure member, means mounting said members for rotation about normally parallel axes, and means for adjusting one of said members in a direction transverse to a plane common to the axes of said members, to dispose the axes of said members in non-parallel and non-coplanar relation.

12. Winding apparatus comprising a frame, a work-supporting mandrel journaled thereon, a work-supporting platform on said frame, an apron between the platform and the mandrel and over which the work is fed from the platform to the mandrel, the work-supporting surface of said apron being angularly disposed downwardly relative to the work-supporting surface of said platform, whereby to subject the upper surface of the work to greater tension than the lower surface thereof.

13. Winding apparatus comprising a frame, a work-supporting mandrel journaled thereon, means for rotating said mandrel to wind work thereon, a source of binding material, and means for guiding and feeding said binding material from said source to the work, comprising a support, an arm pivotally connected at one end thereof to said support and being movable relative thereto to dispose its free end adjacent the work, hollow guide means on said arm through which the binding material is fed to the work, and means on said arm frictionally engaging the binding material to subject the latter to predetermined tension.

14. In winding apparatus; a work supporting member; a pressure member, one of said members being movable toward and away from the other member; means forming a closed chamber including a movable element adapted to restrict movement of said one member; a liquid filling in said chamber, cooperating with said element to restrict movement of said one member, said element being adapted to displace liquid from said chamber upon movement of said member in one direction; means providing restricted liquid discharge from said chamber to maintain a predetermined fluid pressure therein in response to displacing movement of said element; and means freely admitting liquid to said chamber in response to movement of said element in the opposite direction.

15. In winding apparatus: a work supporting member; a pressure member, one of said members being movable toward and away from the other member; means forming a closed chamber including a movable element adapted to restrict movement of said one member; a liquid filling in said chamber, cooperating with said element to restrict movement of said one member, said element being adapted to displace liquid from said chamber upon movement of said member in one direction; and means responsive to a rise of fluid pressure in said chamber above a predetermined maximum for discharging liquid therefrom as well as responsive to a fall of fluid pressure therein below a predetermined minimum for passing liquid to said chamber.

16. In winding apparatus: a work supporting member; a pressure member, one of said members being movable toward and away from the other member; means forming a closed chamber including a movable element adapted to restrict movement of said one member; a liquid filling in said chamber, cooperating with said element to restrict movement of said one member, said element being adapted to displace liquid from said chamber upon movement of said member in one direction; and means responsive to variations in the fluid pressure in said chamber with respect to a predetermined pressure for passing liquid to cause movement of said element.

17. In winding apparatus: a work supporting member; a pressure member; means forming a closed chamber including a movable element; means whereby said element supports one of said members for movement toward and away from the other member; a liquid filling in said chamber and cooperating with said element to support said one member against movement, said element being adapted to displace liquid from said chamber upon movement of said member in one direction; and means responsive to an increase in the fluid pressure of said liquid for discharging liquid from said chamber to cause movement of said element and said member.

18. In winding apparatus: a work supporting member; a pressure member; means forming a closed chamber, including a movable element; means whereby said element supports one of said members for movement toward and away from the other member; a liquid filling in said chamber, cooperating with said element to support said one member, said element being adapted to displace liquid from said chamber upon movement of said member in one direction; and means including a discharge opening for maintaining a predetermined fluid pressure in said chamber during said movement.

19. In winding apparatus: a work supporting member; a pressure member; means forming a closed chamber, including a movable element; means whereby said element supports one of said members for movement toward and away from the other member; a liquid filling in said chamber, cooperating with said element to support said one member, said element being adapted to displace liquid from said chamber upon movement of said member in one direction; and means responsive to variations of the fluid pressure in said chamber with respect to a predetermined pressure for controlling the displacement of said liquid.

20. In winding apparatus: a work supporting member; a pressure member; means mounting one of said members for movement toward and away from the other member; means forming a closed liquid filled chamber, including a movable element for supporting said one member, said element being adapted to displace liquid from said chamber upon movement of said member in one direction; and means responsive to an increase of the fluid pressure in said chamber for discharging liquid therefrom.

21. In winding apparatus: a work supporting member; a pressure member; means mounting one of said members for movement toward and away from the other member; means forming a closed liquid filled chamber, including a movable element for supporting said one member, said element being adapted to displace liquid from said chamber upon movement of said member in one direction; and means responsive to an increase of the fluid pressure in said chamber above a predetermined pressure for discharging liquid from the chamber to maintain said predetermined pressure in the chamber.

VICTOR SAGER.

REFERENCES CITED

The following references are of record in the file of this patent:

UNITED STATES PATENTS

| Number | Name | Date |
|---|---|---|
| 1,283,812 | Lacroix | Nov. 5, 1918 |
| 1,373,040 | White | Mar. 29, 1921 |
| 1,620,044 | Stockes | Mar. 8, 1927 |
| 1,655,631 | Gordon | Jan. 10, 1928 |
| 1,821,556 | Layfield | Sept. 1, 1931 |
| 1,853,384 | Snow | Apr. 12, 1932 |
| 2,055,039 | Meisel | Sept. 22, 1936 |
| 2,154,081 | Anderson et al. | Apr. 11, 1939 |
| 2,194,078 | Simonds | Mar. 15, 1940 |
| 2,250,560 | Winslow | July 29, 1941 |
| 2,304,088 | Hastings et al. | Dec. 8, 1942 |